Figure 1:
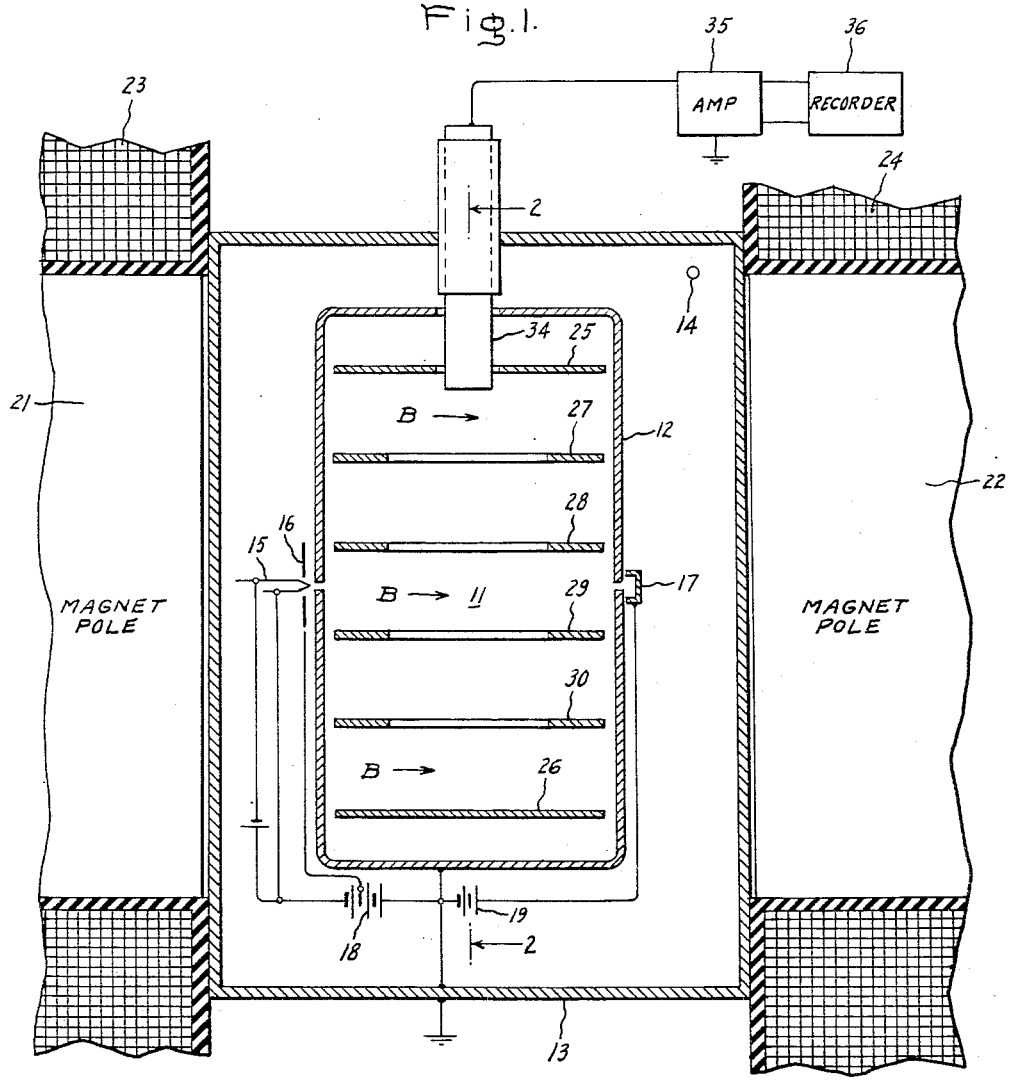

Dec. 28, 1954   G. JERNAKOFF   2,698,389
RADIO FREQUENCY MASS SPECTROMETER
Filed July 20, 1953   3 Sheets-Sheet 2

Inventor:
George Jernakoff,
by Merton D. Moore
His Attorney.

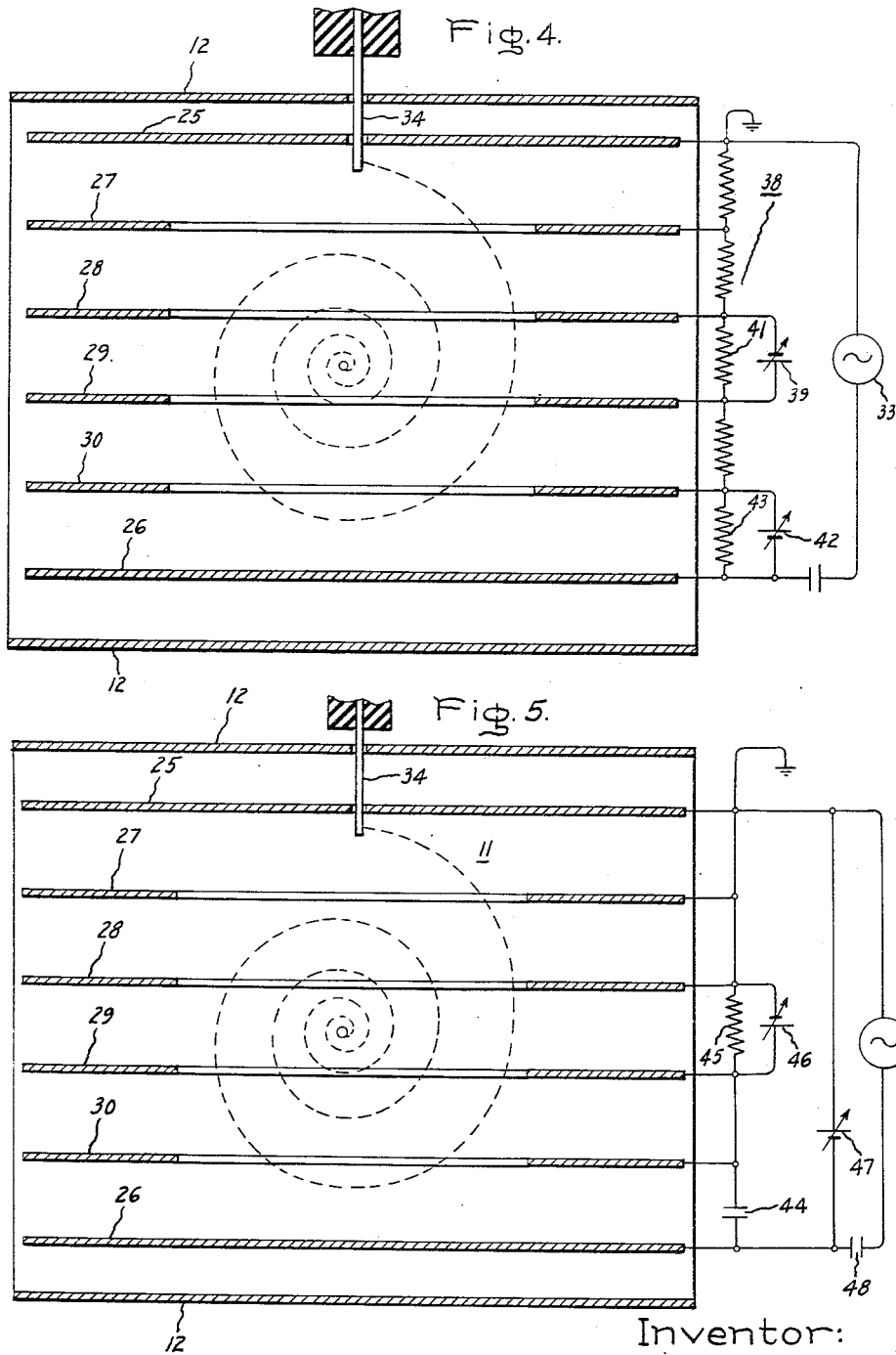

United States Patent Office 2,698,389
Patented Dec. 28, 1954

2,698,389

RADIO FREQUENCY MASS SPECTROMETER

George Jernakoff, Schenectady, N. Y., assignor to General Electric Company, a corporation of New York Application July 20, 1953, Serial No. 369,169

15 Claims. (Cl. 250—41.9)

The present invention relates to a mass analyzing instrument.

More specifically, the invention relates to a mass analyzing instrument of the type utilizing a crossed magnetic and alternating electric field having a frequency of alternation corresponding to the natural frequency of ions having a desired mass for effecting separation of such ions from ions having undesired masses.

Mass analyzing instruments of the above-identified type are relatively well known in the industry today, and are generally satisfactory, they do have certain limitations. For example, many of the instruments do not have sufficient resolving power within certain mass ranges. The resolving power is the ability of the instrument to distinguish between two different materials having distinctly different but nearly alike masses; therefore, it is desired that the instrument have as great a resolving power as possible. Other undesired characteristics of the known instruments of this type include the production of non-linear effects caused by undesired space charges accruing in the critical ion accelerating regions, as well as by disturbances due to non-uniform distribution of the alternating electric field. The non-linear effects are undesirable because they cause the output signal of the instrument to vary in a manner otherwise than as a direct proportion of the number of ions having a desired mass introduced into the instrument.

It is therefore one object of the present invention to provide a new and improved mass analyzing instrument having improved resolving power over a wide range of mass values.

Another object of the invention is to provide a new and improved mass analyzing instrument wherein adverse effects of non-uniformity in the alternating electric field distribution are substantially overcome.

A still further object of the invention is to provide an improved instrument wherein non-linearity effects produced by space charges built up in critical ion accelerating regions of the analyzer chamber of the instrument are overcome without adversely affecting the resolving power of the instrument.

In practicing the invention, a mass analyzing instrument is provided which includes an analyzer chamber, a means for ionizing samples of matter introduced into the chamber, and means for producing a magnetic field across the analyzer chamber. A means for producing a concentrated alternating electric field gradient normal to the magnetic field across substantially only a centrally disposed elemental region of the analyzer chamber is provided with the alternating electric field having a frequency of alternation that corresponds to the natural frequency of ions possessing a desired mass whereby such ions are accelerated in spiral paths. The instrument further includes a probe means for collecting the ions accelerated in the above described manner, together with a means for removing ions having an undesired natural frequency from the region of the crossed magnetic and alternating electric fields. If desired, the instrument may also include a means for producing a concentrated unidirectional field gradient across substantially only the centrally disposed elemental region of the analyzer chamber, and/or also a means for producing a concentrated direct electric field gradient adjacent the end of the analyzer chamber opposite the probe collecting means for improving separation of the accelerated ions. A preferred embodiment of the invention incorporates all three of the above mentioned features of construction; however, if desired, instruments may be constructed in accordance with the invention which incorporate only one of such features.

Other objects, features and many of the attendant advantages of this invention will be appreciated more readily as the same becomes better understood by reference to the following detailed description, when considered in connection with the accompanying drawings, wherein like parts in each of the several figures are identified by the same reference character, and wherein:

Fig. 1 is a cross-sectional view of a mass analyzing instrument constructed in accordance with the present invention, and illustrates the manner in which certain electrically operable elements of the invention are connected in electrical circuit relationship.

Figure 2:
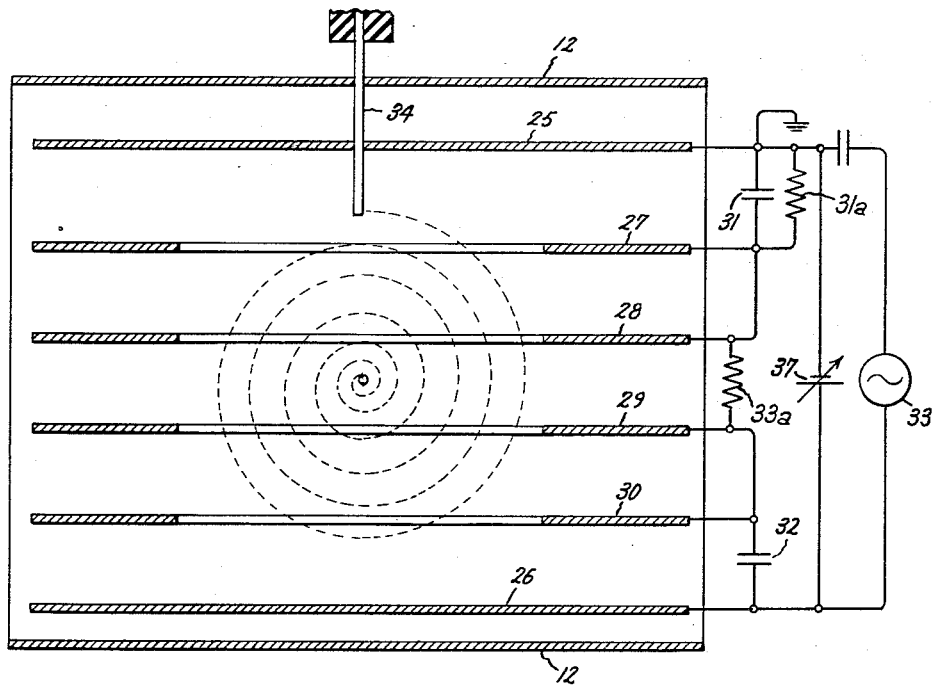
Figure 3:
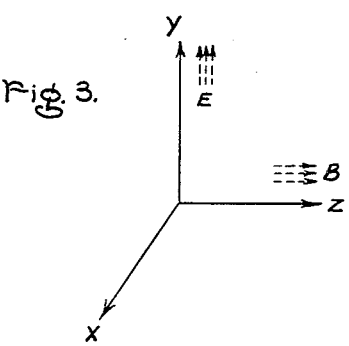

Fig. 2 is a cross-sectional view of the analyzer region of the mass analyzing instrument illustrated in Fig. 1, taken transverse to the plane of the instrument shown in Fig. 1, and illustrates one manner of connecting the instrument to a source of alternating electric potential, Fig. 3 is a vector diagram illustrating the relative directional relationship of the crossed magnetic and alternating electric fields produced within the instrument, Fig. 4 is a cross-sectional view of the analyzer region of the mass analyzing instrument shown in Fig. 1, and illustrates a second manner of connecting the instrument to a source of alternating electric potential; and Fig. 5 is a cross-sectional view of the analyzer region of the mass analyzing instrument shown in Fig. 1, and illustrates a third, preferred manner of connecting the instrument to a source of alternating electric potential.

The mass analyzing instrument shown in Figs. 1 and 2 of the drawing includes an analyzer chamber 11 which is defined by an inner housing member 12 and an outer housing 13 constructed of some suitable metallic non-magnetic material such as stainless steel. The outer housing 13 forms a vacuum-tight structure, and has an opening 14 therein for providing an inlet for gaseous samples of matter to be analyzed into the analyzer chamber area 11 as well as outlet (not shown) for such gases that are not used by the instrument. The housing 12 is substantially rectangular in shape with the ends thereof open so as to allow excess of gaseous matter introduced through opening 14 to diffuse within the area 11. Gaseous matter thus introduced into the analyzer chamber area is subjected to bombardment by an electron beam produced across the analyzer chamber by a cathode filament 15, a focusing electrode 16, and a plate or collector electrode 17 having suitable biasing potentials applied thereto from batteries 18 and 19, respectively. In operation, electrons traversing the analyzer chamber area 11 collide with individual molecules of gaseous matter introduced into the chamber for analysis, and produce ions which have masses that are characteristic of the matter being analyzed. The process whereby ions are formed through the bombardment of the gaseous molecules by an electron beam has been described relatively well in the literature, and it is believed to be well known in the art today. However, for a further explanation of the phenomena reference is made to an article by A. J. Dempster in vol. 20, Physical Review (1922), page 631.

In order to effect separation of ions having a desired characteristic mass from other ions that might possibly be formed during the electron bombardment process, means are provided for producing a magnetic field across the analyzer chamber. This means comprises a pair of opposed electromagnet pole pieces 21 and 22 which are surrounded by respective exciting coils 23 and 24. The pole pieces 21 and 22, when energized by current flow through the energizing coils 23 and 24, produce a unidirectional magnetic field having a uniform flux distribution throughout the analyzer chamber region 11. This magnetic field extends in a direction parallel to the plane of the drawing in the manner illustrated by the arrows B.

In addition to the magnetic field B, it is necessary that an alternating electric field having a frequency of alternation that corresponds to the natural frequency of ions having the desired mass, be applied across at least a portion of the analyzer chamber in order to achieve separaration of the ions having the desired mass from undesired ions. For this purpose means are provided for producing such a concentrated alternating electric field gradient which is normal to the magnetic field, across substantially only a centrally disposed elemental region of the analyzer chamber. This last mentioned means comprises an electrode arrangement having a pair of oppositely disposed plate electrode members 25 and 26 mounted within the inner housing 12, and insulatingly therefrom by supporting means not shown. Positioned between each of the plate electrode members are a plurality of substantially ring-shaped members 27, 28, 29 and 30 which actually comprise flat conductive plates having a central rectangular opening therein. The ring-shaped members 27 through 30 are supported within the housing 12 by suitable insulating supports (not shown) which serve to insulate each of the ring-shaped members from the housing 12, the plate electrode members 25, 26 and the remaining ring-shaped members.

As is best shown in Fig. 2 of the drawings, each of the plate members 27 through 30 has an alternating current electrical interconnection to the nearest ring-shaped members. In the particular embodiment of the invention shown, the alternating current electrical interconnections comprise electrical conductors for connecting ring-shaped members 27 and 28 through a parallel circuit comprised by an alternating current coupling capacitor 31 and a leakage resistor 31a to plate member 25, and conductors through an alternating current coupling capacitor 32 for connecting ring-shaped members 29 and 30 to plate member 26. A source of alternating electric potential 33 is connected between or across plate electrode members 25 and 26, and in conjunction with the plate and ring-shaped electrode members, and a resistor 33a connected between ring-shaped electrodes 28 and 29, serves to produce a concentrated alternating electric field gradient in the centrally disposed region of the analyzer chamber. This alternating electric field is chosen to have a frequency which corresponds to the natural frequency of ions possessing a desired mass whereby the alternating electric field and magnetic field coact to cause ions having natural frequencies corresponding to the frequency of alternation of the alternating electric field to be accelerated in spiral paths, in the manner indicated by the dotted lines in Fig. 2, within the area enclosed by the plate electrode members 25 and 26 and the ring-shaped electrode members 27 through 30. The ions thus accelerated are caused to spiral outward a sufficient distance until they impinge or collect upon a collecting probe means 34 that is inserted into the analyzer chamber, and is electrically connected to the input of an indicating circuit arrangement comprised of an amplifier 35 and recorder 36 indicated in Fig. 1 of the drawings. The output electric signal produced by the impingement of the accelerated ions on probe 34 is then indicative of the existence of materials having a desired mass characteristic in the composition being analyzed. Simultaneously with this action, ions formed in the analyzer chamber region which possess natural frequencies other than that corresponding to the frequency of the applied alternating electric field are caused to oscillate back and forth in a tight spiral around the ionizing beam of electrons, and remain somewhat confined to the central region of the analyzer chamber. Since these undesired ions are not accelerated outwardly, they do not affect the output electric signal supplied to the amplifier 35 and recorder 36. As a result of connecting the radio-frequency energizing source 33 to the plate and ring-shaped electrodes 25, 26 and 27—30, respectively, in the above-identified manner, the concentrated alternating electric field gradient produced across only substantially the centrally-disposed region of the analyzer chamber acts to impart a considerable amount of energy to the resonant ions during the initial phases of their movement so that they are quickly removed from the area in which the non-resonant ions tend to congregate. Further, the concentrated alternating electric field thus produced also serves to focus the non-resonant ions in the centrally disposed region so as to facilitate their removal.

By definition, the following relations are established with relation to Fig. 3 of the drawings: the magnetic field B extends in the Z direction, the electric field E extends parallel to the Y direction, and ions are formed along the Z axis. With the above relations established, then mathematical expressions for the movement of the accelerated or resonant ions can be derived in the following manner:

The vector equation of motion of an ion in a crossed magnetic and electric field is given by the expression:

$$m\vec{a} = Q\vec{\epsilon} + Q\vec{v} \times \vec{H} \qquad (1)$$

where
$m$ is the mass of the ion
$\vec{a}$ is the vector acceleration of the ion
$Q$ is the charge on the ion
$\vec{\epsilon}$ is the vector electric field
$\vec{v}$ is the vector velocity of the ion, and
$\vec{H}$ is the vector magnetic field If Equation 1 is rearranged to express the terms thereof in Cartesian coordinates, the following expressions are obtained:

$$m\frac{d^2x}{dt^2} = QH\frac{dy}{dt} \qquad (2)$$

$$m\frac{d^2y}{dt^2} = Q\epsilon_y - QH\frac{dx}{dt} \qquad (3)$$

$$m\frac{d^2z}{dt^2} = 0 \qquad (4)$$

where $\frac{d^2x}{dt^2}$ is the acceleration of the ion in the $x$ direction $\frac{dy}{dt}$ is the velocity of the ion in the $y$ direction $\frac{d^2y}{dt^2}$ is the acceleration of the ion in the $y$ direction $\epsilon_y$ is the $y$ component of $\epsilon$ $\frac{dx}{dt}$ is the velocity of the ion in the $x$ direction and $\frac{d^2z}{dt^2}$ is the acceleration of the ion in the $z$ direction If for the purpose of convenience we assume that the ion is originally at rest at the origin of the coordinate system, then the following relations hold true: At times $t = 0$.

$$x = y = z = \frac{dx}{dt} = \frac{dy}{dt} = \frac{dz}{dt} = 0$$

From a consideration of Expression 4 with respect to the last set forth relations, it can be appreciated that the ions can be assumed to remain in the $xy$ plane, and that the following discussion may be properly confined to the development of Equations 2 and 3. If the instantaneous oscillator voltage (i. e. the alternating electric field applied across plates 25 and 26) is expressed by the following relation:

$$e = E \cos(wt + \tau) \qquad (5)$$

where $e$ is the instantaneous value of the oscillator voltage $e$ applied across plates 25 and 26
$w$ is the angular frequency of the oscillator voltage
$t$ is the time in question, and
$\tau$ is the initial phase of the oscillator voltage.

The potential gradient existing between the region bounded by ring-shaped members 28 and 29 is given by the expression:

$$V(y, t) = \frac{y}{D} E \cos(wt + \tau) \qquad (6)$$

where $V(y, t)$ is the potential gradient in the $y$ direction expressed as a function of $t$, and
$D$ is the distance between plates 28 and 29.

Equation 6 may be differentiated with respect to $y$ to give the $y$ component ($\epsilon_y$) of the vector electric field $\bar{\epsilon}$:

$$\epsilon_y = -\frac{\partial v}{\partial y} = -\frac{E}{D}\cos(wt+\tau) \qquad (7)$$

Separation of variables in Equations 2 and 3 can be accomplished by differentiating Equation 2 and substituting the result into Equation 3, so that the following expressions can be obtained:

$$\frac{d^3x}{dt^3} + \left(\frac{QH}{m}\right)^2 \frac{dx}{dt} = -\frac{Q^2HE}{m^2D}\cos(wt+\tau) \qquad (8)$$

$$\frac{d^3y}{dt^3} + \left(\frac{QH}{m}\right)^2 \frac{dy}{dt} = \frac{QEw}{mD}\sin(wt+\tau) \qquad (9)$$

By definition the following relations are assumed to be true.

$$\frac{dy}{dt} = P; \quad \frac{QEw}{mD} = A$$

and from basic electron physics it is known that $$w_0 = \frac{QH}{m}$$

where
P is the time derivative of $y$
A is a readily determinable parameter, and
$w_0$ is the natural angular frequency of the ion By substituting the above relations in Equation 9, the following expression can be obtained:

$$\frac{d^2P}{dt^2} + w_0^2 P = A\sin(wt+\tau) \qquad (10)$$

Equation 10 represents the well known forced harmonic oscillator expression, and may be solved by finding the complimentary function ($P_c$) and the particular integral ($P_p$). They are:

$$P_c = C_1 \sin w_0 t + C_2 \cos w_0 t \qquad (11)$$
$$P_p = C_3 \sin(wt+\varphi) \qquad (12)$$

where
$C_1$ is a constant of integration
$C_2$ is a constant of integration
$C_3$ is a constant of integration
$\varphi$ is a constant of integration When $C_1$, $C_2$, $C_3$ and $\varphi$ are defined so as to assure the initial conditions in $y$ are:

$$y_0 = dy\frac{(0)}{dt} = 0$$

the following expression is obtained:

$$y(t) = \frac{A}{ww_0(w_0^2 - w^2)}[\cos w_0 t \cos \tau - w \sin w_0 t \sin \tau - w_0 \cos(wt+\tau)] \qquad (13)$$

If $\Delta w$ is defined as:

$$\Delta w = w - w_0 \text{ and } A = \alpha w w_0$$

where $\Delta w$ is the amount of detuning of the natural frequency of the ion from the frequency of alternation of the applied electric field, $a$ is a parameter that equals $$\frac{E}{DH}\left(\alpha = \frac{E}{DH}\right)$$

Substituting these relations in Equation 13, and allowing $\Delta w \rightarrow 0$ results in:

$$y(t) \rightarrow \frac{\alpha}{\Delta w \rightarrow 0} \frac{\alpha}{2w_0}[\sin w_0 t \sin \tau - w_0 t \sin(w_0 t + \tau)] \qquad (14)$$

As resonance occurs when $\Delta w \rightarrow 0$, it can be seen from Equation 14 that $y$ increases without limit as $t$ increases, hence, resonant ions will be separated out from non-resonant ions whose masses do not have a natural frequency corresponding to the frequency of alternation of the applied electric field.

In order to derive an expression for the resolving power of the instrument (i. e., the ability of the instrument to distinguish ions having a desired mass from ions having undesired masses), the relation defined immediately preceding Equation 14, may be substituted in Equation 13 in a manner to result in the following expression:

$$y(t) = \frac{A}{ww_0(w_0^2 - w^2)}[\cos w_0 t \cos \tau - w \sin w_0 t \sin \tau - w_0 \cos(wt+\tau)] \qquad (15)$$

or $$y(t) = \frac{\alpha w_0}{(w_0^2 - w^2)}[\cos(w_0 t+\tau) - \cos(wt+\tau)] - \frac{\alpha \Delta w}{(w_0^2 - w^2)}\sin w_0 t \sin \tau \qquad (16)$$

By squaring the expression $w = w_0 + \Delta w$, and substituting the resulting relation in Equation 16, the equation reduces to the following expression:

$$y(t) = \frac{\alpha}{\partial \Delta w}[\cos(w_0 t+\tau)\cos\Delta\omega t - \sin(w_0 t+\tau)\sin\Delta\omega t - \cos(w_0 t+\tau)] + \frac{\alpha}{\partial w_0}[\sin w_0 t \sin \tau] \qquad (17)$$

We know that $\cos \Delta\omega t$ is approximately equal to 1 if $\Delta\omega t$ is very much smaller than 1 (i. e. $\cos \Delta\omega t \approx 1$ if $\Delta\omega t \ll 1$). Hence, Equation 17 can be further simplified in the following manner:

$$y(t) = -\frac{\alpha}{\partial \Delta w}[\sin(w_0 t+\tau)\sin\Delta\omega t] + \frac{\alpha}{\partial w_0}[\sin w_0 t \sin \tau] \qquad (18)$$

or $$\frac{\partial y(t)}{\alpha} = \frac{\sin w_0 t \sin \tau}{w_0} - \frac{\sin(w_0 t+\tau)\sin\Delta\omega t}{\Delta w} \qquad (19)$$

or $$\frac{\partial y(t)}{\alpha} \leq \frac{1}{w_0} + \frac{1}{\Delta w} = \frac{\Delta w + w_0}{w_0 \Delta w} \approx \frac{1}{w_0}\left(\frac{w}{\Delta w}\right) \qquad (20)$$

Equation 20 may be written:

$$ym = \frac{w\alpha}{\partial w_0 \Delta w} \qquad (21)$$

where $ym$ is the maximum possible $y$ value for an ion whose natural frequency is detuned from the frequency of alternation of the applied alternating electric field by an amount $\Delta w$.

If the resolving power of the instrument is defined as the ratio $$\frac{w}{\Delta w}$$

Equation 21 can be further simplified to provide an expression for the resolving power of the instrument.

$$\frac{w}{\Delta w} = \frac{\partial w_0 ym}{\alpha} = \frac{\partial QDH^2 ym}{mE} = R.P.$$

where R. P. is the resolving power of the instrument.

In addition to the above described features of construction a means is provided for removing undesired ions which possess natural frequencies other than that corresponding to the frequency of the alternating electric field for the region of the crossed magnetic and alternating electric field where such undesired ions would normally tend to congregate. In prior instruments of this type, removal of the non-resonant ions has been effected by means of a small direct electric bias applied between the plates 25 and 26 from a source of direct current electric energy 37, in the manner illustrated in Fig. 2 of the drawings. This direct electric field causes the non-resonant ions (e. g., the ions whose masses are such that their natural frequencies correspond to the frequency of alternation of the applied electric field) to be swept out of the analyzer region in a direction that is transverse to both the magnetic and electric fields. While this arrangement for non-resonant ion removal is satisfactory for the most part, it does have certain undesirable characteristics included amongst which is the tendency to remove resonant as well as non-resonant ions from the analyzer chamber.

In order to overcome the difficulties encountered with the arrangement described in the preceding paragraph, an improved arrangement is provided which comprises a means for producing a concentrated, unidirectional field gradient across substantially only the centrally disposed elemental region of the analyzer chamber bounded by the two innermost ring-shaped electrodes 28 and 29 whereby undesired ions of the above identified type which tend to congregate in this region are caused to migrate out of the region in a direction transverse to both the magnetic and the alternating electric field. In the particular embodiment of the invention shown in Fig. 4 of the drawings, the concentrated direct electric field is provided by means of a resistance potential divider 38 connected between the two plate electrode members 25 and 26 in parallel circuit relationship with the source of alternating electric potential 33, and supplied with suitable tap off connections to each of the ring-shaped electrodes 27, 28, 29 and 30. A source of unidirectional potential, preferably a variable battery 39 is connected between the ring-shaped electrode members 28 and 29 in parallel circuit relationship with a portion 41 of the resistance divider, and in conjunction with the resistor 41, provides the concentrated direct electric field in the centrally disposed region of the analyzer chamber. If desired, a low frequency, substantially square wave potential may be applied across resistor 41 in a manner such that a pulsating unidirectional field having a relatively slow repetition rate is produced between region bounded by ring-shaped electrode members 28 and 29. The action of the unidirectional concentrated electric field in the region between the innermost ring-shaped electrode members 28 and 29, whether it be steady or pulsating, is to cause a general migration of the non-resonant ions out of the region in a direction which is transverse to both the magnetic and the alternating electric fields. These non-resonant ions migrate out between the areas of the electrode members 28 and 29 and impinge upon housing member 13 which is returned to ground potential. By the production of the concentrated unidirectional field in this central disposed region, removal of the non-resonant ions is achieved most efficiently since it is in this region that such ions tend to congregate, and build up an undesired space charge. By restricting the concentrated direct electric field to this region only, no detrimental D. C. field need be applied across the entire analyzer chamber so as to affect adversely the resolving power of the instrument within certain mass ranges by sweeping out resonant as well as non-resonant ions. In this manner, non-linearities which might otherwise occur in the instrument operation, due to space charge build up within the centrally disposed region of the analyzer chamber, are overcome without affecting the resolving power of the instrument.

To improve separation of materials having distinctly different, but nearly alike masses further, and hence, thereby improve the resolving power of the instrument, a means for producing a concentrated direct electric field gradient adjacent the end of the analyzer chamber remote from the collecting probe 34, also is provided in the present invention. In the embodiment of the invention disclosed in Fig. 4, this means comprises a second source of direct current electric energy 42 which is connected between the plate electrode member 26 and the next adjacent ring-shaped electrode member 30, in parallel circuit relationship with portion 43 of resistance divider 38, and which in conjunction with the resistor portion 43, serves to produce a concentrated direct electric field between the plate electrode member 26 and the next adjacent ring-shaped electrode member 30. This direct electric field gradient located at the extremities of the excursion of the resonant ions that are accelerated in spiral paths, acts as an energy filter upon the resonant ions further to select out the higher energy resonant ions and thereby improve further the resolving power of the instrument.

A preferred arrangement energizing the instrument with an alternating electric field, which arrangement includes the features of both of the arrangements shown in Figs. 2 and 4, is illustrated in Fig. 5 of the drawings. This preferred arrangement includes a means for producing a concentrated alternating electric field gradient which is normal to the magnetic field, across substantially only a centrally disposed elemental region of the analyzer chamber. This last mentioned means comprises an electrode arrangement which includes the pair of oppositely disposed plate electrode members 25 and 26 mounted within the inner housing 12, and insulatingly supported therefrom by supporting means not shown. Positioned between each of the plate electrode members 25 and 26 are the plurality of substantially ring-shaped members 27, 28, 29 and 30 which actually comprise flat conductive plates having a central rectangular opening therein. The ring-shaped electrode members 27 through 30 are supported within the housing 12 by suitable insulating supports (not shown) which serve to insulate each of the ring-shaped members from the housing 12, the plate electrode members 25, 26, and the remaining ring-shaped electrode members. Each of the ring-shaped members 27 through 30 has an alternating current electrical interconnection to the nearest plate electrode member 25 or 26. These alternating current electrical interconnections comprise suitable electrical conductors for connecting ring-shaped members 27 and 28 to plate member 25, and for connecting ring-shaped members 29 and 30 to plate member 26 through a coupling capacitor 44 that acts as a direct current blocking capacitor. A source of alternating electric potential 33 is connected between or across plate electrode members 25 and 26, and in conjunction with the plate and ring-shaped electrode members, serves to produce a concentrated alternating electric field gradient in the centrally disposed region of the analyzer chamber. This alternating electric field is chosen to have a frequency which corresponds to the natural frequency of ions possessing a desired mass whereby the alternating electric field and magnetic field coact to cause such ions to be accelerated in spiral paths, in the manner indicated by dotted lines, within the area enclosed by the plate electrode members 25 and 26 and the ring-shaped electrode members 27 through 31. The ions thus accelerated are caused to spiral outward a sufficient distance until they impinge or collect upon the collecting probe 34.

Simultaneously with the above-described action, ions formed in the analyzer chamber region which possess natural frequencies other than that corresponding to the frequency of the applied alternating electric field, are caused to oscillate back and forth in a tight spiral path about the ionizing beam of electrons, and remain somewhat confined to the central accelerated region of the analyzer chamber. Since these undesired ions are not accelerated outwardly, they do not tend to affect the output electric signals supplied by the collecting probe 34. However, if such ions were allowed to collect or remain within the region, they would build up an undesirable space charge which would introduce non-linearities into the output signal provided by the instrument. In order to remove these undesired non-resonant ions a means for producing a concentrated unidirectional field gradient across susbtantially only the centrally disposed elemental region of the analyzer chamber bounded by the two innermost ring-shaped members 28 and 29 is provided whereby these undesired ions are caused to migrate out of the region in a direction transverse to both the magnetic and alternating electric field. This means comprises a resistor 45 which is connected between the two innermost ring-shaped members 28 and 29, and a source of unidirectional potential, preferably a variable battery 46, connected across the terminals of the resistor 45. If desired, a low frequency, substantially square wave pulsating potential may be applied across the resistor 43 in a manner such that a pulsating unidirectional field is produced between the region bounded by the ring-shaped members 28 and 29. The action of this unidirectional concentrated electric field in the region described, whether it be steady or pulsating, is to cause a general migration of the non-resonant undesired ions out of the region in a direction which is transverse to both the magnetic and alternating electric field. These non-resonant ions tend to migrate out between the areas of the electrode members 28 and 29 where they impinge upon housing member 13, which is returned to ground potential.

To further improve separation of materials having distinctly different but nearly alike masses, and hence thereby improve the resolving power of the instrument, a means for producing a concentrated direct electric field gradient adjacent the end of the analyzer chamber remote from the collecting probe 34, is also provided in the preferred embodiment of the invention shown in Fig. 5. This means comprises a second source of direct current electric energy 47 which is connected between the plate electrode members 25 and 26, and in conjunction with the capacitor 44 serves to produce a concentrated direct electric field gradient between the plate electrode member 26 and the next adjacent ring-shaped electrode member 30. This direct electric field gradient being located at the extremities of the excursion of the resonant ions accelerated in spiral paths, acts as an energy filter to separate further the higher energy resonant ions. By the provision of this additional means the overall resolution of the instrument can be greatly improved. In order to prevent short circuiting of the direct electric potential provided by the sources 46 or 47, a D. C. blocking capacitor 48 may be connected between each of the sources and the source of alternating electric potential 39.

Having described the construction of a preferred embodiment of the invention, its operation is as follows: gaseous samples of the material to be analyzed are supplied to the analyzer chamber 11 through the inlet 14 from which point they diffuse into the analyzer chamber. Gas molecules thus delivered, are subjected to the action of an electron beam formed by electrons emitted from the cathode filament 15 and focused into a beam by the focusing electrodes 16 and the target electrodes 17. The electron beam moves parallel to the magnetic field produced by the magnet poles 21 and 22, and hence are somewhat constrained thereby into the form of a very narrow beam. Collision of the electrons in the electron beam with molecules of the material being analyzed forms ions upon impact which have masses that are characteristic of the molecules of material out of which the ions were formed. The ions thus formed, are accelerated by the alternating electric field applied between the plate electrode members 25 and 26 and the ring-shaped electrode members 27 through 31 so that they tend to oscillate back and forth at the frequency of the applied alternating electric field. Since the ions thus oscillated by the applied alternating electric field are moving at substantially right angles to the magnetic field that exists across the analyzer chamber, the ions tend to follow curved paths having a radius of curvature at any time which is determined by the instantaneous energy of the particle. Since the frequency of the applied alternating electric field is equal to the natural frequency of certain of the ions desired to be separated out, such ions move so as to continuously extract energy from the applied alternating electric field. Hence these ions will move in steadily expanding spiral paths, and after a sufficient number of revolutions will impinge upon the collector probe 34 where they produce an output electric signal that is fed to the amplifier 35 and recorded on the recorder 36. During this operation, the concentrated direct electric field produced across the end of the analyzer chamber remote from the collector probe means 41 serves as an energy filter to enhance separation of the resonant ions traveling in spiral paths. Simultaneously, with this action, non-resonant ions are removed from the centrally disposed region of the analyzer chamber by the concentrated direct unidirectional electric field existing between the ring-shaped electrode members 28 and 29. This unidirectional field in conjunction with the magnetic field causes the non-resonant undesired ions to move out of the space in a direction perpendicular to both the applied magnetic and the alternate electric fields along a substantially cycloidal path. This applied unidirectional field has a relatively low magnitude so that the time required to sweep the non-resonant ions out of the useful space of the analyzer chamber, is relatively long in comparison to the time in which a resonant ion can be collected. Otherwise the unidirectional field would act upon the resonant ions as well as the undesired non-resonant ions. By providing such a long time constant for the action of the sweeping out potential, the sensitivity of the instrument and resolving power are not substantially affected insofar as the action of the sweeping out field on the resonant ions is concerned, but because the sweeping out field does remove the non-resonant ions it prevents the same from building up the space charge which would result in the appearance of non-linearities in the signal obtained with the instrument, the resolving power of the instrument is greatly improved by the application of such centrally applied sweeping out field.

From the foregoing description, it can be appreciated that the invention provides a new and improved mass analyzing instrument having greatly improved resolving power. The instrument incorporates a means wherein adverse effects of non-uniformities appearing in the applied alternating field distribution throughout the analyzing chamber thereof are overcome, and wherein non-linearity effects produced by space charges built up within the analyzer region of the instrument are substantially overcome without affecting adversely the resolving power of the instrument.

Obviously, other modifications and variations of the present invention are possible in light of the above teachings. It is therefore to be understood that changes may be made herein which are within the full intended scope of the invention as defined by the appended claims.

What I claim as new and desire to secure by Letters Patent of the United States is:

1. A mass analyzing instrument including an analyzer chamber, means for ionizing samples of matter introduced into said chamber, means for producing a magnetic field across said analyzer chamber, means for producing a concentrated alternating electric field gradient normal to said magnetic field across substantially only a centrally disposed elemental region of said analyzer chamber, said alternating electric field having a frequency of alternation corresponding to the natural frequency of ions possessing a certain mass whereby such ions may be accelerated in spiral paths, means for collecting the ions thus accelerated, and means for removing ions having an undesired natural frequency from the region of said crossed magnetic and alternating electric fields.

2. A mass analyzing instrument including an analyzer chamber, means for ionizing samples of matter introduced into said chamber, means for producing a magnetic field across said analyzer chamber, means for producing a concentrated alternating electric field gradient normal to said magnetic field across substantially only a centrally disposed elemental region of said analyzer chamber, said alternating electric field having a frequency of alternation corresponding to the natural frequency of ions possessing a certain mass whereby such ions may be accelerated in spiral paths, means for collecting the ions thus accelerated, and means for producing a concentrated unidirectional field gradient across substantially only the centrally disposed elemental region of said analyzer chamber whereby ions having an undesired natural frequency are caused to migrate out of the region of said crossed magnetic and alternating electric fields.

3. A mass analyzing instrument including an analyzer chamber, means for ionizing samples of matter introduced into said chamber, means for producing a magnetic field across said analyzer chamber, means for producing a concentrated alternating electric field gradient normal to said magnetic field across substantially only a centrally disposed elemental region of said analyzer chamber, said alternating electric field having a frequency of alternation corresponding to the natural frequency of ions possessing a certain mass whereby such ions may be accelerated in spiral paths, probe means positioned near one end of the analyzer chamber for collecting the ions thus accelerated, means for producing a concentrated direct electric field gradient adjacent the end of the analyzer chamber opposite said probe means for improving separation of the accelerated ions, and means for removing ions which possess natural frequencies other than that corresponding to the frequency of the alternating electric field from the region of said crossed magnetic and alternating electric fields.

4. A mass analyzing instrument including an analyzer chamber, means for ionizing samples of matter introduced into said chamber, means for producing a magnetic field across said analyzer chamber, means for producing a concentrated alternating electric field gradient normal to said magnetic field across substantially only a centrally disposed elemental region of said analyzer chamber, said alternating electric field having a frequency of alternation corresponding to the natural frequency of ions possessing a certain mass whereby such ions may be accelerated in spiral paths, probe means positioned near one end of the analyzer chamber for collecting the ions thus accelerated, means for producing a concentrated direct electric field gradient adjacent the end of the analyzer chamber opposite said probe means for improving separation of the accelerated ions, and means for producing a concentrated unidirectional electric field gradient across substantially the centrally disposed elemental region of said analyzer chamber whereby ions having an undesired natural frequency are caused to migrate out of the region of said crossed magnetic and alternating electric fields.

5. A mass analyzing instrument including an analyzer chamber, means for ionizing samples of matter introduced into said chamber, means for producing a magnetic field across said analyzer chamber, means for producing an alternating electric field gradient across said analyzer chamber normal to said magnetic field, said alternating electric field having a frequency of alternation corresponding to the natural frequency of ions possessing a certain mass whereby such ions may be accelerated in spiral paths, means for collecting the ions thus accelerated, and means for producing a concentrated direct electric field gradient which is colinear with said alternating field gradient across only an elemental region of said analyzer chamber wherein undesired ions which possess natural frequencies other than that corresponding to the frequency of said alternating electric field tend to congregate whereby such undesired ions are caused to migrate out of the region of said crossed magnetic and alternating electric fields.

6. A mass analyzing instrument including an analyzer chamber, means for ionizing samples of matter introduced into said chamber, means for producing a magnetic field across said analyzer chamber, means for producing an alternating electric field gradient across said analyzer chamber normal to said magnetic field, said alternating electric field having frequency of alternation corresponding to the natural frequency of ions possessing a certain mass whereby such ions may be accelerated in spiral paths, means for collecting the ions thus accelerated, and means for producing a concentrated direct electric field gradient across only substantially a centrally disposed elemental region of said analyzer chamber whereby ions which possess natural frequencies other than that corresponding to the frequency of said alternating electric field are caused to migrate out of the region of said crossed magnetic and alternating electric fields.

7. A mass analyzing instrument including an analyzer chamber, means for ionizing samples of matter introduced into said chamber, means for producing a magnetic field across said analyzer chamber, means for producing an alternating electric field gradient normal to said magnetic field across said analyzer chamber, said alternating electric field having a frequency of alternation corresponding to the natural frequency of ions possessing a certain mass whereby such ions may be accelerated in spiral paths, probe means positioned near one end of the analyzer chamber for collecting the ions thus accelerated, means for producing a concentrated direct electric field gradient adjacent the end of the analyzer chamber opposite said probe means for improving separation of the accelerated ions, and means for removing ions which possess natural frequencies other than that corresponding to the frequency of the alternating electric field from the region of said crossed magnetic and alternating electric fields.

8. A mass analyzing instrument including an analyzer chamber, means for ionizing samples of matter introduced into said chamber, means for producing a magnetic field across said analyzer chamber, means for producing an alternating electric field gradient normal to said magnetic field across said analyzer chamber, said alternating electric field having a frequency of alternation corresponding to the natural frequency of ions possessing a certain mass whereby such ions may be accelerated in spiral paths, probe means positioned near one end of the analyzer chamber for collecting the ions thus accelerated, means for producing a concentrated direct electric field gradient adjacent the end of the analyzer chamber opposite said probe means for improving separation of the accelerated ions, and means for producing a second concentrated unidirectional field gradient across only substantially a centrally disposed elemental region of said analyzer chamber whereby ions which possess natural frequencies other than that corresponding to the frequency of said alternating electric field are caused to migrate out of the region of said crossed magnetic and alternating electric fields.

9. In a mass analyzing instrument including an analyzer chamber, means for ionizing samples of matter introduced into said chamber, means for producing a magnetic field across said analyzer chamber, and an electrode arrangement for producing an alternating electric field in said chamber normal to said magnetic field, said electrode arrangement including a pair of oppositely disposed plate electrode members, and a plurality of ring-shaped electrode members positioned intermediate said plate members and electrical insulated one from the other, the improvement of means for providing alternating current electrical interconnections between each of said plate members and the ring-shaped members closest thereto, means for applying an alternating electric potential having a frequency corresponding to the natural frequency of ions possessing a certain mass across said plate members whereby ions having the certain mass are accelerated in spiral paths within the area enclosed by said plate and ring-shaped members, means for collecting such accelerated ions, and means for removing from the region of the crossed magnetic and alternating electric fields the ions which possess natural frequencies other than that corresponding to the frequency of alternation of the electric field.

10. In a mass analyzing instrument including an analyzer chamber, means for ionizing samples of matter introduced into said chamber, means for producing a magnetic field across said analyzer chamber, and an electrode arrangement for producing an alternating electric field gradient in said chamber normal to said magnetic field, said electrode arrangement including a pair of oppositely disposed plate electrode members, and a plurality of ring-shaped electrode members positioned intermediate said plate members and electrically insulated one from the other, the improvement of means for providing alternating current electrical interconnections between each of said plate members and the ring-shaped members closest thereto, means for applying an alternating electric potential having a frequency corresponding to the natural frequency of ions possessing a certain mass across said plate members whereby ions having the certain mass are accelerated in spiral paths within the area enclosed by said plate and ring-shaped members, means for collecting such accelerated ions, and means for producing a concentrated direct electric field gradient which is colinear with said alternating field gradient across only the elemental region of said analyzer chamber bounded by the two innermost ring-shaped electrode members whereby undesired ions which possess natural frequencies other than that corresponding to the frequency of the alternating electric field are caused to migrate out of such region.

11. In a mass analyzing instrument including an analyzer chamber, means for ionizing samples of matter introduced into said chamber, means for producing a magnetic field across said analyzer chamber, and an electrode arrangement for producing an alternating electric field in said chamber normal to said magnetic field, said electrode arrangements including a pair of oppositely disposed plate electrode members, and a plurality of ring-shaped electrode members positioned intermediate said plate members and electrically insulated one from the other, the improvement of means for providing alternating current electrical interconnections between each of said plate members and the ring-shaped members closest thereto, means for applying an alternating electric potential having a frequency corresponding to the natural frequency of ions possessing a certain mass across said plate members whereby ions having the certain mass are accelerated in spiral paths within the area enclosed by said plate and ring-shaped members, probe means disposed adjacent one of said plate members for collecting such accelerated ions, means for producing a concentrated direct electric field gradient between the plate member positioned opposite said probe means and the ring-shaped member adjacent thereto for improving separation of the accelerated ions, and means for removing from the region of the crossed magnetic and alternating electric fields the ions which possess natural frequencies other than that corresponding to the frequency of the alternating electric field.

12. In a mass analyzing instrument including an analyzer chamber, means for ionizing samples of matter introduced into said chamber, means for producing a magnetic field across said analyzer chamber, and an electrode arrangement for producing an alternating electric field in said chamber normal to said magnetic field, said electrode arrangements including a pair of oppositely disposed plate electrode members, and a plurality of ring-shaped electrode members positioned intermediate said plate members and electrically insulated one from the other, the improvement of means for providing alternating current electrical interconnections between each of said plate members and the ring-shaped members closest thereto, means for applying an alternating electric potential having a frequency corresponding to the natural frequency of ions possessing a certain mass across said plate members whereby ions having the certain mass are accelerated in spiral paths within the area enclosed by said plate and ring-shaped members, probe means disposed adjacent one of said plate members for collecting such accelerated ions, means for producing a concentrated direct electric field gradient between the plate member positioned opposite said probe means and the ring-shaped member adjacent thereto for improving separation of the accelerated ions, and means for producing a concentrated direct electric field gradient between the two innermost ring-shaped electrode members whereby ions which possess natural frequencies other than that corresponding to the frequency of the alternating electric field are caused to migrate out of the elemental region wherein crossed magnetic and alternating electric fields exist.

13. In a mass analyzing instrument including an analyzer chamber, means for ionizing samples of matter introduced into said chamber, means for producing a magnetic field across said analyzer chamber, and an electrode arrangement for producing an alternating electric field in said chamber normal to said magnetic field, said electrode arrangement including a pair of oppositely disposed plate electrode members, and a plurality of ring-shaped electrode members positioned intermediate said plate members and electrically insulated one from the other, the improvement of means for providing alternating current electrical interconnections between each of said plate members and the ring-shaped members closest thereto, means for applying an alternating electric potential having a frequency corresponding to the natural frequency of ions possessing a certain mass across said plate members whereby ions having the certain mass are accelerated in spiral paths within the area enclosed by said plate and ring-shaped members, a resistor connected between the two innermost ring-shaped members, a source of direct electric potential connected across said resistor, and probe means positioned adjacent the remaining plate member for collecting the accelerated ions.

14. In a mass analyzing instrument including an analyzer chamber, means for ionizing samples of matter introduced into said chamber, means for producing a magnetic field across said analyzer chamber, and an electrode arrangement for producing an alternating electric field in said chamber normal to said magnetic field, said electrode arrangements including a pair of oppositely disposed plate electrode members, and a plurality of ring-shaped electrode members positioned intermediate said plate members and electrically insulated one from the other, the improvement of means for providing alternating current conductive paths between each of said plate members and the ring-shaped members closest thereto, and including a capacitor connected between one of said plate members and the ring-shaped member nearest thereto, means for applying an alternating electric potential having a frequency corresponding to the natural frequency of ions possessing a certain mass across said plate members whereby ions having the certain mass are accelerated in spiral paths within the area enclosed by said plate and ring-shaped members, a resistor connected between the two innermost ring-shaped members, a source of direct electric potential connected across said resistor, probe means positioned adjacent the remaining plate member for collecting the accelerated ions, a second source of direct electric potential connected between said plate members, and a capacitor connected between said second source of direct electric potential and the source of alternating electric potential for isolating the source of alternating electric potential from the second source of direct electric potential.

15. A mass analyzing instrument including an analyzer chamber, means for ionizing samples of matter introduced into said chamber, means for producing a magnetic field across said analyzer chamber, means for producing a concentrated alternating electric field gradient normal to said magnetic field across substantially only an elemental region of said analyzer chamber, said alternating electric field having a frequency of alternation corresponding to the natural frequency of ions possessing a certain mass whereby such ions may be accelerated in spiral paths, means for collecting the ions thus accelerated, and means for removing ions having an undesired natural frequency from the region of said crossed magnetic and alternating electric fields.

No references cited.